US012676910B2

(12) United States Patent
Shetty et al.

(10) Patent No.: US 12,676,910 B2
(45) Date of Patent: Jul. 7, 2026

(54) CONTROLLED IMAGE STORAGE USING DYNAMIC BENCHMARKING ON EDGE DEVICES

(71) Applicant: International Business Machines Corporation, Armonk, NY (US)

(72) Inventors: Shilpa Shetty, Sydney (AU); Rahil Garnavi, Ivanhoe East (AU); Ramachandra Rao Kolluri, Cranbourne East (AU); Jignesh Karia, Thane (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 18/341,877

(22) Filed: Jun. 27, 2023

(65) Prior Publication Data

US 2025/0007979 A1     Jan. 2, 2025

(51) Int. Cl.
| | |
|---|---|
| *H04L 67/1097* | (2022.01) |
| *G06N 3/0464* | (2023.01) |
| *G06V 10/40* | (2022.01) |
| *G06V 10/82* | (2022.01) |

(52) U.S. Cl.
CPC ....... *H04L 67/1097* (2013.01); *G06N 3/0464* (2023.01); *G06V 10/40* (2022.01); *G06V 10/82* (2022.01)

(58) Field of Classification Search
CPC ..... H04L 67/1097; G06V 10/40; G06V 10/82
See application file for complete search history.

(56) References Cited

U.S. PATENT DOCUMENTS

| | | | | |
|---|---|---|---|---|
| 8,238,671 B1 * | 8/2012 | Babenko | ................ | G06V 20/20 |
| | | | | 382/224 |
| 10,607,383 B2 * | 3/2020 | Rakshit | ................ | H04N 23/698 |
| 2008/0215664 A1 | 9/2008 | Dibbern | | |
| 2010/0289953 A1 * | 11/2010 | Wang | .................... | H04N 9/643 |
| | | | | 348/E5.062 |

(Continued)

OTHER PUBLICATIONS

Adegbija et al., "Enabling Right-Provisioned Microprocessor Architectures For The Internet Of Things", Proceedings of the ASME 2015 International Mechanical Engineering Congress & Exposition IMECE2015 Nov. 13-19, 2015, Houston, Texas, 10 pages, <https://www.researchgate.net/publication/281865569>.

(Continued)

*Primary Examiner* — Dhairya A Patel
(74) *Attorney, Agent, or Firm* — Gavin Giraud

(57) ABSTRACT

A method, computer program product, and computer system are provided for storing images and/or other data on an edge computing device in an edge computing environment. Data is received from one or more sensors operatively coupled to the edge computing device. One or more features and metadata are extracted from the received data. The extracted features and metadata are compared to a pre-defined tolerance range and one or more exogenous variables. The received data is caused to be stored on either the edge computing device or a second edge computing device based on a determination that the compared features and metadata falls within the tolerance range or outside of the tolerance range, respectively.

20 Claims, 4 Drawing Sheets

(56) References Cited

U.S. PATENT DOCUMENTS

| | | | | |
|---|---|---|---|---|
| 2014/0293993 | A1* | 10/2014 | Ryhorchuk | H04L 43/16 370/350 |
| 2015/0043884 | A1* | 2/2015 | Takasu | G11B 27/22 386/201 |
| 2018/0034884 | A1* | 2/2018 | Niuwenhuys | H04L 67/12 |
| 2018/0096457 | A1* | 4/2018 | Savvides | G06V 10/764 |
| 2018/0129657 | A1* | 5/2018 | Guest | G06F 9/485 |
| 2018/0165305 | A1* | 6/2018 | Wang | G06F 16/5838 |
| 2018/0183874 | A1* | 6/2018 | Cook | H04L 41/145 |
| 2019/0228093 | A1* | 7/2019 | Falcao | G06F 16/24542 |
| 2019/0273695 | A1* | 9/2019 | Bahl | H04L 47/83 |
| 2020/0012966 | A1 | 1/2020 | Nagaraju | |
| 2020/0327371 | A1 | 10/2020 | Sharma | |
| 2020/0385116 | A1* | 12/2020 | Sabripour | G08G 5/723 |
| 2021/0266346 | A1* | 8/2021 | Gordon | H04L 63/0245 |
| 2022/0121884 | A1* | 4/2022 | Zadeh | G06N 3/006 |
| 2022/0188695 | A1* | 6/2022 | Zhu | G06N 3/08 |
| 2022/0235102 | A1* | 7/2022 | Pfenning | C12N 15/86 |

OTHER PUBLICATIONS

Baurle et al., "ComB: A Flexible, Application-Oriented Benchmark for Edge Computing", Proceedings of the 5th International Workshop on Edge Systems, Analytics and Networking (EdgeSys '22), Apr. 5-8, 2022, Rennes, France, 6 pages, <https://dl.acm.org/doi/abs/10.1145/3517206.3526269>.

Carpio et al., "BenchFaaS: Benchmarking Serverless Functions in an Edge Computing Network Testbed", Cornell University, arXiv:2206. 02150, Aug. 17, 2022, 8 pages, <https://arxiv.org/pdf/2206.02150. pdf>.

Das et al., "EdgeBench: Benchmarking Edge Computing Platforms", Proceedings of the Fourth International Workshop on Serverless Computing (WoSC) 2018, Dec. 20, 2018, Zurich, Switzerland, 7 pages, <https://www.researchgate.net/publication/328953135_EdgeBench_Benchmarking_Edge_Computing_Platforms>.

Lujic et al., "Efficient Edge Storage Management Based on Near Real-Time Forecasts", Proceedings of the 2017 IEEE 1st International Conference on Fog and Edge Computing (ICFEC), Madrid, Spain, May 14-15, 2017, 10 pages, <https://ieeexplore.ieee.org/document/8014356>.

Magid et al., "Image Classification on IoT Edge Devices: Profiling and Modeling", Cluster Computing, 23, 2020, pp. 1025-1043, <https://arxiv.org/pdf/1902.11119.pdf >.

Rajput et al., "EdgeFaaSBench: Benchmarking Edge Devices Using Serverless Computing", Procedures of the 2022 IEEE International Conference on Edge Computing and Communications (EDGE), Barcelona, Spain, Jul. 10-16, 2022, 11 pages, <https://wwang.github.io/papers/EdgeFaaSBench.pdf >.

Varghese et al., "A Survey on Edge Performance Benchmarking", ACM Computing Surveys, Dec. 2020, 21 pages, <https://www.researchgate.net/publication/347381739_A_Survey_on_Edge_Performance_Benchmarking>.

* cited by examiner

100

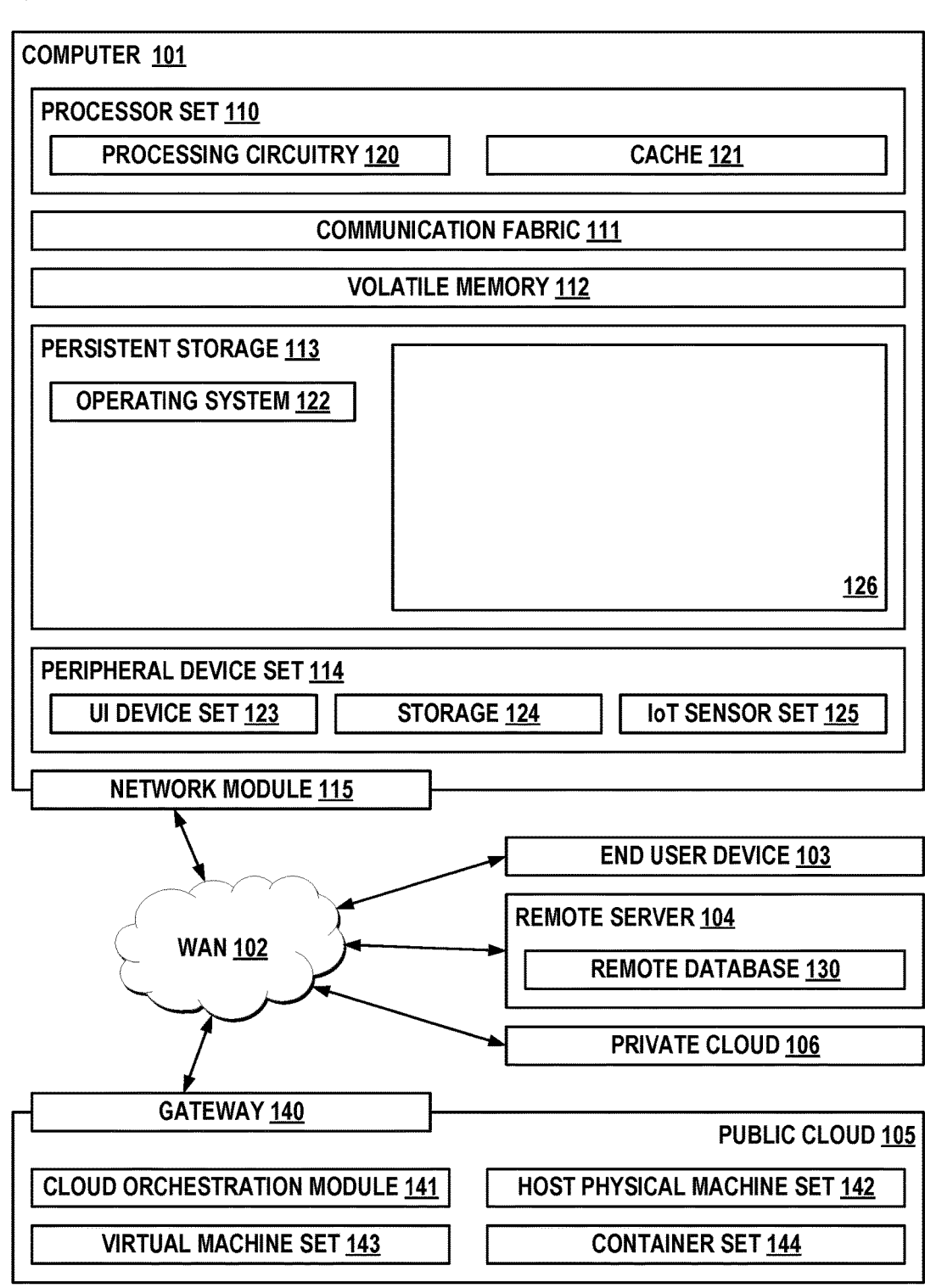

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

126

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

Data Storage
Device 206

Processor
204

Software
Program
208

Computer 202

Communication Network
210

Database
212

Image Storage
and Transfer
Program
216

Server Computer 214

CONTROLLED IMAGE STORAGE USING DYNAMIC BENCHMARKING ON EDGE DEVICES

FIELD

This disclosure relates generally to the field of edge computing, and more particularly to image processing in an edge computing environment.

BACKGROUND

Edge computing is a distributed computing framework that brings enterprise applications closer to data sources such as IoT devices or local edge servers. Specifically, in an edge computing environment, client data is processed at the periphery of the network, as close to the originating source as possible. This proximity to data at its source can deliver strong business benefits, including faster insights, improved response times and better bandwidth availability.

SUMMARY

Embodiments relate to a method, system, and computer program product for storing images and/or other data on an edge computing device in an edge computing environment. According to one aspect, a method for identifying data to be stored on an edge computing device in an edge computing environment is provided. The method may include receiving data from one or more sensors operatively coupled to the edge computing device. One or more features and metadata are extracted from the received data. The extracted features and metadata are compared to a pre-defined tolerance range and one or more exogenous variables. The received data is caused to be stored on either the edge computing device or a second edge computing device based on a determination that the compared features and metadata falls within the tolerance range or outside of the tolerance range, respectively.

According to another aspect, a computer system for identifying data to be stored on an edge computing device in an edge computing environment is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data from one or more sensors operatively coupled to the edge computing device. One or more features and metadata are extracted from the received data. The extracted features and metadata are compared to a pre-defined tolerance range and one or more exogenous variables. The received data is caused to be stored on either the edge computing device or a second edge computing device based on a determination that the compared features and metadata falls within the tolerance range or outside of the tolerance range, respectively.

According to yet another aspect, a computer program product for identifying data to be stored on an edge computing device in an edge computing environment is provided. The computer program product may include one or more computer-readable storage devices and program instructions stored on at least one of the one or more tangible storage devices, the program instructions executable by a processor. The program instructions are executable by a processor for performing a method that may accordingly include receiving data from one or more sensors operatively coupled to the edge computing device. One or more features and metadata are extracted from the received data. The received data is caused to be stored on either the edge computing device or a second edge computing device based on a determination that the compared features and metadata falls within the tolerance range or outside of the tolerance range, respectively.

According to one or more aspects, the method may further include updating the tolerance range based on minimizing an occurrence of false positives and false negatives associated with the received data and the tolerance range.

According to one or more aspects, the one or more features are extracted through a region-based convolutional neural network or bidirectional generative adversarial network.

According to one or more aspects, the sensors comprise one or more from among a camera, a microphone, a thermometer, a pressure sensor, a humidity sensor, a seismic sensor, an accelerometer, and a motion detector.

According to one or more aspects, the one or more exogenous variables correspond to one or more sensor inputs, comprising one or more from among a pressure value, a temperature value, a humidity value, an amount or presence of vibration, and an amount or presence of motion.

According to one or more aspects, comparing the extracted features and metadata to the pre-defined tolerance range and the one or more exogenous variables includes verifying the received data against a union or average of other data having a same timestamp as the received data.

According to one or more aspects, the received data corresponds to one or more from among sensor data, audio data, an image, and a video.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a networked computer environment according to at least one embodiment;

DETAILED DESCRIPTION

Figure 2:
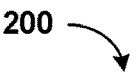
FIG. 2 illustrates a networked computer environment according to at least one embodiment

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of edge computing, and more particularly to image processing in an edge computing environment. The following described exemplary embodiments provide a system, method, and computer program product to, among other things, store images on an edge computing device in an edge computing environment.

Embodiments relate to a method, system, and computer program product for storing images and/or other data on an edge computing device in an edge computing environment. According to one aspect, a method for identifying data to be stored on an edge computing device in an edge computing environment is provided. The method may include receiving data from one or more sensors operatively coupled to the edge computing device. One or more features and metadata are extracted from the received data. The extracted features and metadata are compared to a pre-defined tolerance range and one or more exogenous variables. The received data is caused to be stored on either the edge computing device or a second edge computing device based on a determination that the compared features and metadata falls within the tolerance range or outside of the tolerance range, respectively.

According to another aspect, a computer system for identifying data to be stored on an edge computing device in an edge computing environment is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data from one or more sensors operatively coupled to the edge computing device. One or more features and metadata are extracted from the received data. The extracted features and metadata are compared to a pre-defined tolerance range and one or more exogenous variables. The received data is caused to be stored on either the edge computing device or a second edge computing device based on a determination that the compared features and metadata falls within the tolerance range or outside of the tolerance range, respectively.

According to yet another aspect, a computer program product for identifying data to be stored on an edge computing device in an edge computing environment is provided. The computer program product may include one or more computer-readable storage devices and program instructions stored on at least one of the one or more tangible storage devices, the program instructions executable by a processor. The program instructions are executable by a processor for performing a method that may accordingly include receiving data from one or more sensors operatively coupled to the edge computing device. One or more features and metadata are extracted from the received data. The received data is caused to be stored on either the edge computing device or a second edge computing device based on a determination that the compared features and metadata falls within the tolerance range or outside of the tolerance range, respectively.

Some aspects have the capacity to improve the field of edge computing by allowing for decreased storage requirements for images and other information captured by edge devices. Moreover, some aspects may allow users to define lightweight benchmarks against which images and information may be checked. By acting as a dynamic filtering layer, the benchmarks may additionally help with large scale volume optimization.

According to one or more aspects, the method may further include updating the tolerance range based on minimizing an occurrence of false positives and false negatives associated with the received data and the tolerance range. In the case of false negatives, this may help in avoiding frequent benchmark updates. In the case of false positives, this may prevent an incorrect identification of data to be off-loaded in cases where it may be more appropriate for the data to remain on a given edge device.

According to one or more aspects, the one or more features are extracted through a region-based convolutional neural network or bidirectional generative adversarial network. Such neural network architectures may allow for efficient feature extraction.

According to one or more aspects, the sensors comprise one or more from among a camera, a microphone, a thermometer, a pressure sensor, a humidity sensor, a seismic sensor, an accelerometer, and a motion detector. Such sensors may allow the edge device(s) to collect a variety of data and improve the capabilities of the edge computing environment.

According to one or more aspects, the one or more exogenous variables correspond to one or more sensor inputs, comprising one or more from among a pressure value, a temperature value, a humidity value, an amount or presence of vibration, and an amount or presence of motion. The exogenous variables may provide contextual environmental information associated with the received data.

According to one or more aspects, comparing the extracted features and metadata to the pre-defined tolerance range and the one or more exogenous variables includes verifying the received data against a union or average of other data having a same timestamp as the received data. This may allow for the prevention of captured errors from skewing storage volume optimization.

According to one or more aspects, the received data corresponds to one or more from among sensor data, audio data, an image, and a video. This may allow the edge device to process data in various forms and for different types of data to be collected.

As previously described, edge computing is a distributed computing framework that brings enterprise applications closer to data sources such as IoT devices or local edge servers. Specifically, in an edge computing environment, client data is processed at the periphery of the network, as close to the originating source as possible. This proximity to data at its source can deliver strong business benefits, including faster insights, improved response times and better bandwidth availability.

However, experts estimate that the number of edge devices will grow to over one hundred fifty billion devices by 2025 and expect a virtual flooding of data. As such, the deployment of these edge devices is expected to cause an overwhelming need for extensive storage resources to support the enormous volumes of data. Managing the data storage and backup of the data will itself become a challenge over-shadowing the advantages of edge devices. Currently, Internet-of-Things (IoT) devices stream continuous data inputs to the edge devices. However, while IoT devices stream images and information irrespective of the fact whether the data being streamed provides any additional insights or not, edge devices need to have the capabilities to be able to process this information, requiring large volumes compute and storage devices.

It may be advantageous, therefore, for edge devices to store only a subset of images that are "materially signifi-cant." Materially significant information may include images or information within a range of a dynamic bench-mark that may be established based on pre-defined criteria. For example, when a deviation is identified, the benchmark may be recalibrated by leveraging both spatial and temporal information and a subset of images and information that are significant. Information used for the revised benchmark may be stored, and additional insights may be tagged to images and information that is being discarded.

Various aspects of the present disclosure are described by narrative text, flowcharts, block diagrams of computer sys-tems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two opera-tions shown in successive flowchart blocks may be per-formed in reverse order, as a single integrated step, concur-rently, or in a manner at least partially overlapping in time.

A computer program product embodiment ("CPP embodi-ment" or "CPP") is a term used in the present disclosure to describe any set of one, or more, storage media (also called "mediums") collectively included in a set of one, or more, storage devices that collectively include machine readable code corresponding to instructions and/or data for perform-ing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the forego-ing. Some known types of storage devices that include these mediums include: diskette, hard disk, random access memory (RAM), read-only memory (ROM), erasable pro-grammable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electro-magnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program product for storing images and/or other data on an edge computing device in an edge computing environment. Referring now to FIG. 1, Computing environment 100 contains an example of an environment for the execution of at least some of the computer code involved in performing the inventive meth-ods, such as Dynamic Benchmarking 126. In addition to Dynamic Benchmarking 126, computing environment 100 includes, for example, computer 101, wide area network (WAN) 102, end user device (EUD) 103, remote server 104, public cloud 105, and private cloud 106. In this embodiment, computer 101 includes processor set 110 (including process-ing circuitry 120 and cache 121), communication fabric 111, volatile memory 112, persistent storage 113 (including oper-ating system 122 and Dynamic Benchmarking 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop com-puter, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-imple-mented method may be distributed among multiple comput-ers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated inte-grated circuit chips. Processing circuitry 120 may imple-ment multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative prox-imity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth-ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Dynamic Benchmarking 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Dynamic Benchmarking 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating a dynamic benchmarking system 200 (hereinafter "system") for storing images and/or other data on an edge computing device in an edge computing environment is depicted according to one or more embodiments. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for storing images and/or other data on an edge computing device in an edge computing environment is enabled to run an Image Storage and Transfer Program 216 (hereinafter "program") that may interact with a database 212. The Image Storage and Transfer Program is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger image storage and transfer program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
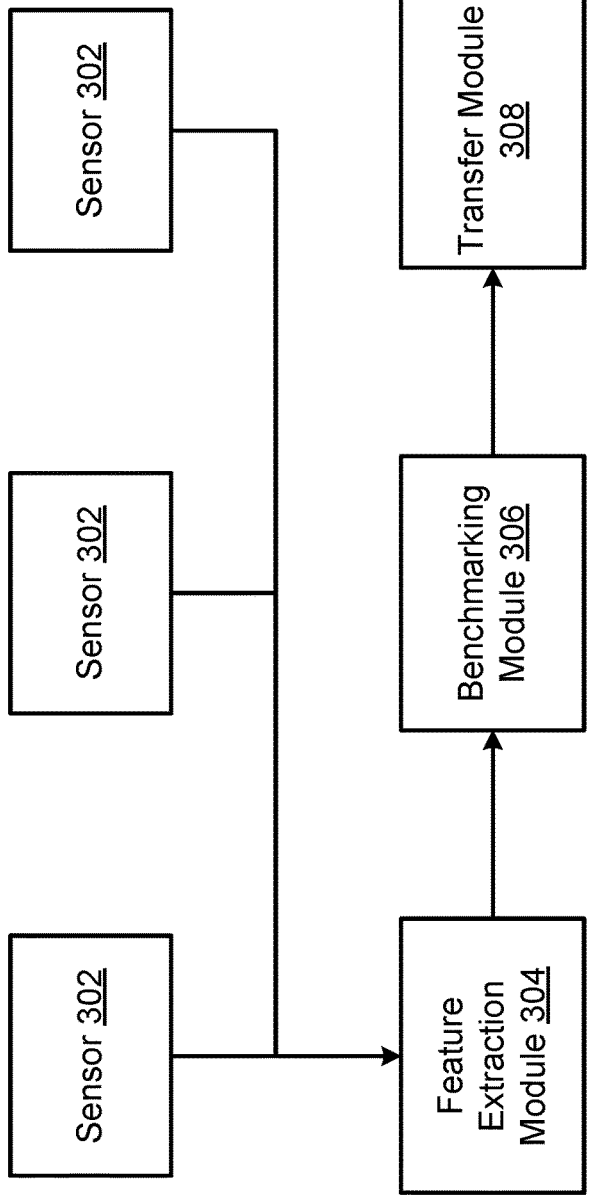
FIG. 3 is a block diagram of a system for storing images and/or other data on an edge computing device in an edge computing environment, according to at least one embodiment.

Referring now to FIG. 3, a block diagram of an edge device 300 that may store images is depicted according to one or more embodiments. The edge device 300 may include, among other things, a sensor 302, a feature extraction module 304, a benchmarking module 306, and a transfer module 308. It may be appreciated that although the embodiments disclosed herein are described with respect to image processing, such disclosed embodiments may be used to process substantially any kind of input data, such as audio data, an image, a video, a pressure value, a temperature value, a humidity value, an amount or presence of vibration, an amount or presence of motion, etc.

The sensor 302 may be substantially any sensor that can be used in Internet of Things (IoT) applications. For example, the sensor 302 may include, among other things, a camera, a microphone, a thermometer or other temperature sensor, a pressure sensor, a humidity sensor, a seismic sensor, an accelerometer, a motion detector, or the like. The sensor 302 may be configured to capture information within the range or field of view of the sensor 302.

The feature extraction module 304 may receive the information captured by the sensor 302. The feature extraction module 304 may assess this information for relevance and material significance. The feature extraction module 304 may additionally discard unimportant artifacts of the information. For example, in the case of images, the feature extraction module may determine one image or a portion thereof is materially significant. The feature extraction module may select a timestamped version of the information as the initial benchmark. The timestamped version of the information may include a state of the materially significant artifacts.

The feature extraction module 304 may set a threshold or tolerance value for each part of the materially significant information. For images, this information may include, among other things, height and width dimensions, file size, the presence or absence of given features, and red-green-blue values for pixels in the image. For sounds, this information may include amplitude and frequency. The threshold or tolerance value, therefore, may be used to set the initial benchmark. The threshold or tolerance value may also be defined on exogenous variables such as sound, vibration, temperature, etc.

The benchmarking module 306 may receive the information determined by the feature extraction module 304 to be materially significant. The benchmarking module 306 may set benchmarks dynamically. Such benchmarks may be updated manually, when information is transferred, or on a periodic basis (e.g., hourly).

Because of the limitations of having to run on an edge or IoT device, the mechanism for detecting areas, objects, and artifacts of material significance used by the benchmarking module 306 may need to be lightweight. Accordingly, in the case of images and audio information, the benchmarking module 306 may use a pre-trained model that utilizes deep learning algorithms, such as region-based convolutional neural networks, to define objects and their boundaries. For one-dimensional sensors that detect parameters like vibration, pressure, sound, humidity, temperature, odor, etc., the benchmarking module 306 may use pretrained models that perform pattern recognition, such as bi-directional generative adversarial networks, as the mechanism to define the benchmarks. In cases where environment expertise can be leveraged, the benchmarking module 306 may add manual annotations to the model to define objects, artefacts, and their boundaries. In cases where the tolerance or threshold value is not predefined, the benchmarking module 306 may observe the magnitude of differences between the captured information and a benchmark and may perform convolution around the boundaries of the benchmark image.

To define the tolerance bounds, the benchmarking module 306 may use various mechanisms. For images and video information captured by the sensor 302, the tolerance may vary based on movement within the information. For fixed objects, the tolerance may be almost non-existent. For quasi-fixed objects, the tolerance may be based on the object's normal movement range, speed, acceleration, etc. For detection of moving objects detection, the tolerance may be defined in terms of acceleration, speed, etc. For other sensors, the tolerance may be bounded by periodic characteristics, such as ranges of frequency, amplitude, known aperiodic patterns and outliers, etc. The benchmarking module 306 may account for computational constraints of the edge device 300. Cache memory may be used to store information that is recorded within the computation timeframe to create a pipeline for benchmark validation.

The benchmarking module 306 may utilize time-dependent tolerances where applicable. Automatic periodic updates to the tolerance levels may help avoid information unnecessarily falling outside of the tolerance value and the need for frequent re-benchmarking. During periods that the benchmarking module 306 may determine that there is an overly low amount of data falling outside of the threshold, the benchmarking module 306 may update the benchmark to ensure accuracy by preventing the occurrence of potential false negatives, in which the benchmarking module 306 may not properly identify data that should be off-loaded from the edge device 300. Such periods may be a characteristic of the deployment that can be learned by the benchmarking module 306 over time. The scale and duration of data falling outside of the benchmark tolerance value can be used by the benchmarking module 306 as a signal to update the benchmark, which may help in avoiding frequent benchmark updates. A high benchmark value falling outside of the threshold or tolerance value in a given period of time may also cause the benchmarking module 306 to update the benchmark to avoid false positives, in which the benchmarking module 306 may incorrectly identifies data to be off-loaded in cases where it may be more appropriate for the data to remain on the edge device 300. The initiation of a benchmark update may need to be documented for communication to other edge devices 300. Thus, the benchmarking module 306 may timestamp and save all benchmarks and events causing benchmarks to be updated for further analysis.

The transfer module 308 may select information to be transferred off the edge device 300. Any information that falls outside the benchmark and tolerance limits set by the benchmarking module 306 may be considered as an image of interest for transfer. Using a storage cache, a predetermined information set may be transferred to a local or remote storage device. For example, in the case of images, this information may include a set of images before and after the benchmark, in addition to the tolerance breached by the image. Any exogenous variables that are associated with the same timestamps may also be transferred into storage. The benchmark information is also transferred for reference. To prevent captured errors from skewing storage volume optimization, the transfer module 308 may verify the information against the benchmark on a union or average of the information having the same or similar timestamps, which may be system-dependent due to varying frequencies of capture on different edge devices 300 and sensors 302.

Figure 4:
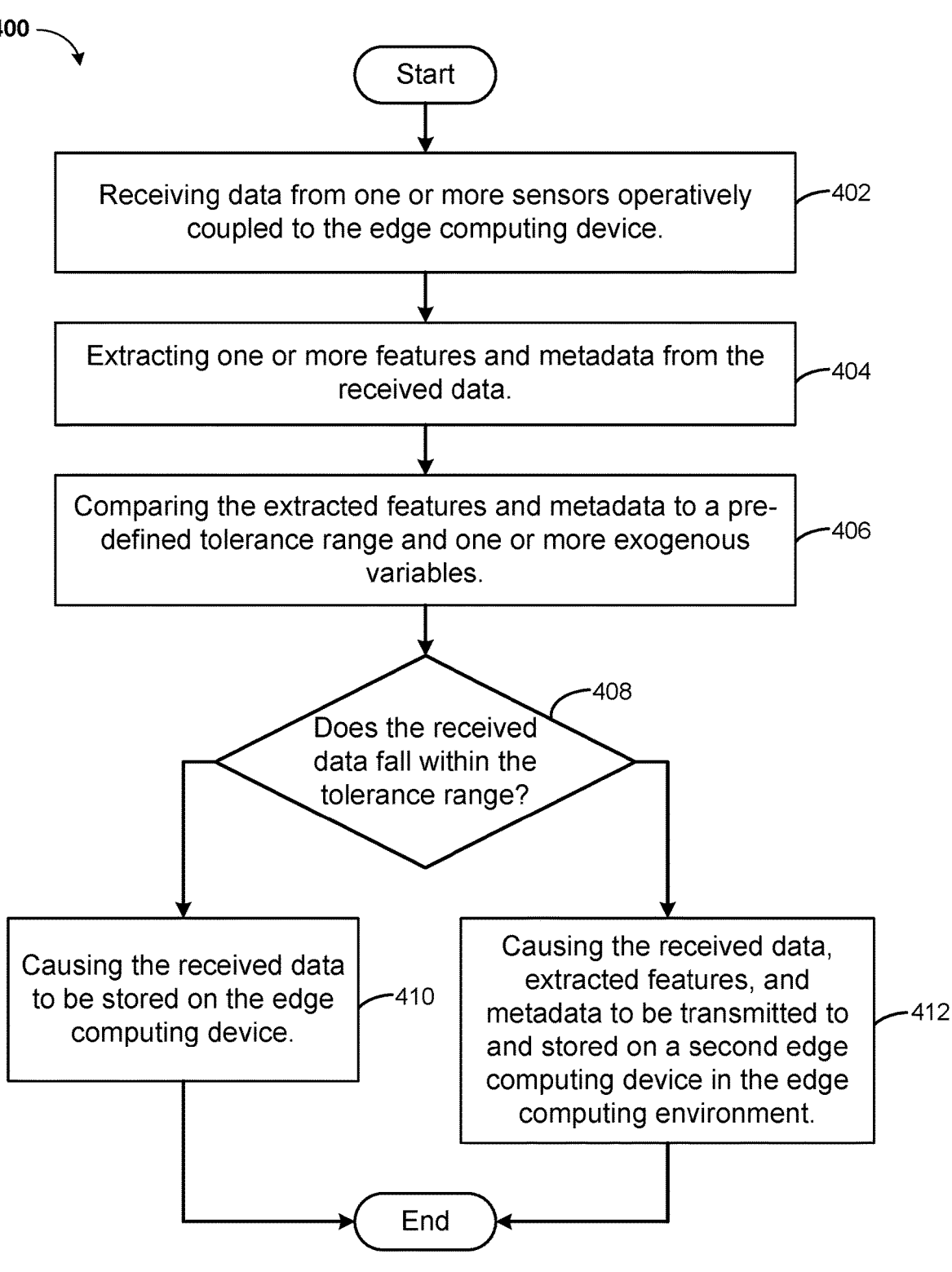
FIG. 4 is an operational flowchart illustrating the steps carried out by a program that stores image on an edge computing device in an edge computing environment, according to at least one embodiment.

Referring now to FIG. 4, an operational flowchart illustrating the steps of a method 400 carried out by a program that stores images on an edge computing device in an edge computing environment is depicted. The method 400 may be described with the aid of the exemplary embodiments of FIGS. 1-3.

At 402, the method 400 may include receiving data from one or more sensors operatively coupled to the edge computing device. The received data corresponds to one or more from among sensor data, audio data, an image, and a video. The sensors include one or more from among a camera, a microphone, a thermometer, a pressure sensor, a humidity sensor, a seismic sensor, an accelerometer, and a motion detector. In operation, the sensors 302 (FIG. 3) may detect various data and may transmit the data to the feature extraction module 304 (FIG. 3).

At 404, the method 400 may include extracting one or more features and metadata from the received data. The one or more features are extracted through a region-based convolutional neural network (R-CNN) or bidirectional generative adversarial network (BiGAN). In operation, the feature extraction module 304 (FIG. 3) may include a neural network such as an R-CNN or a BiGAN. The feature extraction module 304 may extract features from the data detected by the sensors 302 (FIG. 3). The features may include, among other things, object or persons in an image, particular sounds in an audio recording, or other data such as temperature, weather, pressure, etc.

At 406, the method 400 may include comparing the extracted features and metadata to a pre-defined tolerance range and one or more exogenous variables. The exogenous variables correspond to one or more sensor inputs and include one or more from among a pressure value, a temperature value, a humidity value, an amount or presence of vibration, and an amount or presence of motion. In operation, the benchmarking module 306 (FIG. 3) may set benchmark tolerance values for the data detected by the sensors 302 (FIG. 3).

At 408, a determination is made as to whether or not the received data falls within the tolerance range. The tolerance range may be subsequently updated based on minimizing an occurrence of false positives and false negatives associated with the received data and the tolerance range. In operation, the benchmarking module 306 (FIG. 3) may determine that the data picked up by the sensors 302 (FIG. 3), such as images and audio files, may be too large to fit on the edge device 300 (FIG. 3) and may transmits the data to the transfer module 308 (FIG. 3).

At 410, the method 400 may include causing the received data to be stored on the edge computing device based on a determination that the compared features and metadata falls within the tolerance range. In operation, the benchmarking module 306 (FIG. 3) may cause the data to be stored on a storage medium. Such storage medium may substantially correspond to the data storage device 206 (FIG. 2) on the computer 202 (FIG. 2).

At 412, the method 400 may include causing the received data, extracted features, and metadata to be transmitted to and stored on a second edge computing device or a server in the edge computing environment based on a determination that the received data falls outside of the tolerance range. The second edge device may be selected based on parameters associated with the second edge device or based on a physical distance between the first edge device and the second edge device 7. In operation, the transfer module 308

(FIG. 3) may transmit the data to an additional edge device 300 (FIG. 3) or to a central server, such as the server computer 214 (FIG. 2), based on the current edge device 300 not meeting the benchmarking requirements for the data.

It may be appreciated that FIG. 4 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable non-transitory storage medium (or media) having computer readable program instructions thereon for causing a processor to carry out operations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of identifying data to be stored on an edge computing device in an edge computing environment, executable by a processor, comprising:
   receiving data from one or more sensors operatively coupled to the edge computing device;
   accounting for computational constraints of the edge computing device within a computation timeframe to create pre-defined tolerance ranges for benchmark validation;
   extracting one or more features and metadata from the received data, wherein the features comprise an object in an image, height and width dimensions of the image, a file size of the image, red-green-blue values for pixels in the image, and amplitude and frequency of a particular sound in an audio recording;
   comparing each of the features and metadata to the pre-defined tolerance ranges and one or more exogenous variables, wherein the pre-defined tolerance ranges and one or more exogenous variables comprise height and width dimensions, file sizes, red-green-blue values for pixels, and amplitude and frequency of the particular sound; and
   causing the received data to be stored on the edge computing device after a determination that any of the compared features and metadata falls inside of the pre-defined tolerance range for that feature, and causing the received data to be stored on a second edge computing device only after a determination that the compared features and metadata falls outside of the tolerance range.

2. The method of claim 1, further comprising updating the tolerance range based on minimizing an occurrence of false positives and false negatives associated with the received data and the tolerance range.

3. The method of claim 2, wherein the one or more features are extracted through a selection from the group consisting of: a region-based convolutional neural network and bidirectional generative adversarial network.

4. The method of claim 1, wherein the sensors comprise a selection from the group consisting of: a camera, a microphone, a thermometer, a pressure sensor, a humidity sensor, a seismic sensor, an accelerometer, and a motion detector.

5. The method of claim 1, wherein the one or more exogenous variables correspond to one or more sensor inputs, comprising a selection from the group consisting of:

a pressure value, a temperature value, a humidity value, an amount or presence of vibration, and an amount or presence of motion.

6. The method of claim 1, wherein comparing the extracted features and metadata to the pre-defined tolerance range and the one or more exogenous variables comprises a selection from the group consisting of: verifying the received data against a union and average of other data having a same timestamp as the received data.

7. The method of claim 1, wherein the received data corresponds to a selection from the group consisting of: sensor data, audio data, an image, and a video.

8. A computer system for identifying data to be stored on an edge computing device in an edge computing environment, the computer system comprising:
   one or more computer-readable storage media configured to store computer program code; and
   one or more computer processors configured to access said computer program code and operate as instructed by said computer program code, said computer program code including:
      receiving code configured to cause the one or more computer processors to receive data from one or more sensors operatively coupled to the edge computing device;
      accounting code configured to cause the one or more computer processors to account for computational constraints of the edge computing device within a computation timeframe to create pre-defined tolerance ranges for benchmark validation;
      extracting code configured to cause the one or more computer processors to extract one or more features and metadata from the received data, wherein the extracted features comprise an object in an image, height and width dimensions of the image, a file size of the image, red-green-blue values for pixels in the image, and amplitude and frequency of a particular sound in an audio recording;
      comparing code configured to cause the one or more computer processors to compare each of the features and metadata to the pre-defined tolerance ranges and one or more exogenous variables, wherein the pre-defined tolerance range and one or more exogenous variables comprise height and width dimensions, file sizes, red-green-blue values for pixels, and amplitude and frequency of the particular sound; and
      storing code configured to cause the one or more computer processors to cause the received data to be stored on the edge computing device after a determination that any of the compared features and metadata falls inside of the pre-defined tolerance range for that feature, and causing the received data to be stored on a second edge computing device only after a determination that the compared features and metadata falls outside of the tolerance range.

9. The computer system of claim 8, further comprising updating code stored on the one or more computer-readable storage media, the updating code configured to cause the one or more computer processors to update the tolerance range based on minimizing an occurrence of false positives and false negatives associated with the received data and the tolerance range.

10. The computer system of claim 9, wherein the one or more features are extracted through a selection from the group consisting of: a region-based convolutional neural network bidirectional generative adversarial network.

11. The computer system of claim 8, wherein the sensors comprise a selection from the group consisting of: a camera, a microphone, a thermometer, a pressure sensor, a humidity sensor, a seismic sensor, an accelerometer, and a motion detector.

12. The computer system of claim 8, wherein the one or more exogenous variables correspond to one or more sensor inputs, comprising a selection from the group consisting of: a pressure value, a temperature value, a humidity value, an amount or presence of vibration, and an amount or presence of motion.

13. The computer system of claim 8, wherein the comparing code comprises verifying code stored on the one or more computer-readable storage media, the verifying code configured to cause the one or more computer processors to verify the received data against a union or average of other data having a same timestamp as the received data.

14. The computer system of claim 8, wherein the received data corresponds to a selection from the group consisting of: sensor data, audio data, an image, and a video.

15. A computer program product for identifying data to be stored on an edge computing device in an edge computing environment, comprising:

one or more computer-readable storage devices; and program instructions stored on at least one of the one or more computer-readable storage devices, the program instructions configured to cause one or more computer processors to:

receive data from one or more sensors operatively coupled to the edge computing device;

account for computational constraints of the edge computing device within a computation timeframe to create pre-defined tolerance ranges for benchmark validation;

extract one or more features and metadata from the received data, wherein the extracted features comprise an object in an image, height and width dimensions of the image, a file size of the image, red-green-blue values for pixels in the image, and amplitude and frequency of a particular sound in an audio recording;

compare each of the features and metadata to the pre-defined tolerance ranges and one or more exogenous variables, wherein the pre-defined tolerance range and one or more exogenous variables comprise height and width dimensions, file sizes, red-green-blue values for pixels, and amplitude and frequency of the particular sound; and cause the received data to be stored on the edge computing device after a determination that any of the compared features and metadata falls inside of the pre-defined tolerance range for that feature, and causing the received data to be stored on a second edge computing device only after a determination that the compared features and metadata falls outside of the tolerance range.

16. The computer program product of claim 15, further comprising updating code stored on the one or more computer-readable storage devices, the updating code configured to cause the one or more computer processors to update the tolerance range based on minimizing an occurrence of false positives and false negatives associated with the received data and the tolerance range.

17. The computer program product of claim 16, wherein the one or more features are extracted through a selection from the group consisting of: a region-based convolutional neural network and bidirectional generative adversarial network.

18. The computer program product of claim 15, wherein the sensors are selected from the group consisting of: a camera, a microphone, a thermometer, a pressure sensor, a humidity sensor, a seismic sensor, an accelerometer, and a motion detector.

19. The computer program product of claim 15, wherein the one or more exogenous variables correspond to one or more sensor inputs, comprising a selection from the group consisting of: a pressure value, a temperature value, a humidity value, an amount or presence of vibration, and an amount or presence of motion.

20. The computer program product of claim 15, wherein comparing the extracted features and metadata to the pre-defined tolerance range and the one or more exogenous variables comprises a selection from the group consisting of: verifying the received data against a union and average of other data having a same timestamp as the received data.

* * * * *